United States Patent
Ichikawa et al.

(10) Patent No.: US 6,994,931 B2
(45) Date of Patent: Feb. 7, 2006

(54) FUEL CELL POWER PLANT FOR MOBILE UNIT

(75) Inventors: Hiroyuki Ichikawa, Yokohama (JP); Yasukazu Iwasaki, Yokohama (JP)

(73) Assignee: Nissan Motor Co., Ltd., Kanagawa (JP)

(*) Notice: Subject to any disclaimer, the term of this patent is extended or adjusted under 35 U.S.C. 154(b) by 430 days.

(21) Appl. No.: 10/332,270

(22) PCT Filed: Aug. 21, 2002

(86) PCT No.: PCT/JP02/08403
§ 371 (c)(1),
(2), (4) Date: Jan. 7, 2003

(87) PCT Pub. No.: WO03/021740
PCT Pub. Date: Mar. 13, 2003

(65) Prior Publication Data
US 2003/0180583 A1     Sep. 25, 2003

(30) Foreign Application Priority Data
Aug. 30, 2001   (JP)   ............................... 2001-260639

(51) Int. Cl.
H01M 8/04     (2006.01)
B60K 1/00     (2006.01)
B60L 11/00    (2006.01)
(52) U.S. Cl. ...................... 429/22; 429/23; 429/24; 180/65.3; 701/22
(58) Field of Classification Search ............ 429/9, 429/92, 22, 23, 24; 180/65.3; 701/22
See application file for complete search history.

(56) References Cited

U.S. PATENT DOCUMENTS

| 5,987,878 A | 11/1999 | Koyama et al. ............ 60/39.12 |
| 6,158,537 A * | 12/2000 | Nonobe ..................... 180/65.3 |
| 6,645,653 B2 * | 11/2003 | Kashiwagi .................. 429/22 |
| 6,701,229 B2 * | 3/2004 | Iwasaki ....................... 701/22 |

FOREIGN PATENT DOCUMENTS

| DE | 27 23 685 A1 | 11/1978 |
| DE | 19731250 A1 | 1/1998 |

(Continued)

Primary Examiner—Patrick Joseph Ryan
Assistant Examiner—Thomas H. Parsons
(74) Attorney, Agent, or Firm—McDermott Will & Emery LLP

(57) ABSTRACT

A fuel cell power plant is provided for a mobile unit. The mobile unit is provided with a drive device (29) driving the mobile unit when supplied with electrical power. The power plant comprises a fuel cell (21) generating power when supplied with fuel, a battery (27) charged with power generated by the fuel cell, a power regulation device (31) selectively distributing power from the fuel cell (21) and the battery (27) to the drive device (29), and a controller (33) for controlling running operations. The controller (33) estimates the energy required to activate the fuel cell (21), and controls the power regulation device (31) when the energy required to activate the fuel cell is greater than or equal to a determination value so that the fuel cell is not activated and power from the battery (27) is supplied to the drive device (29).

17 Claims, 12 Drawing Sheets

FOREIGN PATENT DOCUMENTS

| | | |
|---|---|---|
| DE | 100 21 815 A1 | 11/2001 |
| EP | 0 913 357 A1 | 5/1999 |
| EP | 1091437 A1 | 5/1999 |
| EP | 1091436 A1 | 4/2001 |
| FR | 2771863 | 6/1999 |
| FR | 2 801 296 A1 | 5/2001 |
| JP | 2001-315511 | 11/2000 |
| WO | WO 97/37929 A1 | 10/1997 |
| WO | WO 01/34424 A1 | 5/2001 |
| WO | WO 01/76731 A1 | 10/2001 |

\* cited by examiner

FIG. 7
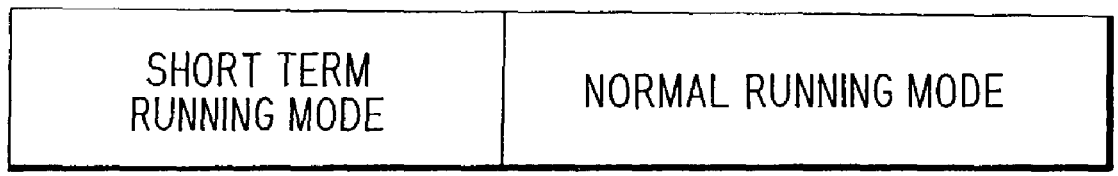
ACTUAL RUNNING TIME sec
ACTUAL RUNNING SPEED m/s
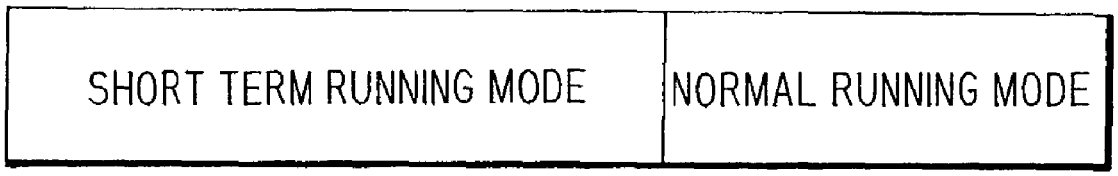
AMOUNT OF ELECTRIC POWER REQUIRED kW
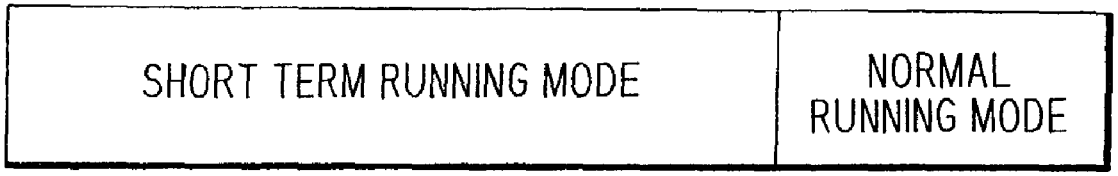
ELECTRIC POWER AMOUNT OF BATTERY CONSUMPTION kW
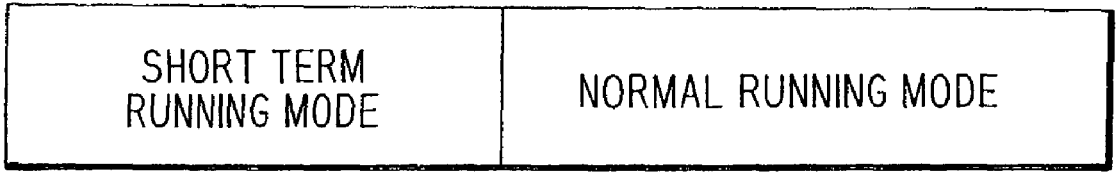
OPERATION SPEED OF ACCEL PEDAL

FUEL CELL POWER PLANT FOR MOBILE UNIT

FIELD OF THE INVENTION

This invention relates to a fuel cell power plant for a mobile unit and in particular, it relates to activation operations therefor.

BACKGROUND OF THE INVENTION

A fuel cell and a battery mounted in a hybrid fuel cell vehicle is known as a conventional fuel cell power plant for a mobile unit by JP-A 2000-315511. A drive motor for running the fuel cell vehicle drives the vehicle when supplied with electrical power from a battery or electrical power generated by the fuel cell.

At vehicle startup, when the driver switching the ignition switch to the ON position, the fuel cell is activated in order to allow vehicle operation. However at startup, the fuel cell is not able to commence power generation immediately. Consequently the vehicle supplies power to the drive motor from the battery. Thereafter, when power generation by the fuel cell is enabled, power is supplied from the fuel cell.

SUMMARY OF THE INVENTION

An amount of power must be supplied in order to activate the fuel cell. In particular, when a fuel reformer is provided which reforms fuel and supplies a gas containing hydrogen to the fuel cell, a large amount of power is required to activate the fuel cell. The required power to activate the fuel cell differs depending on the operating conditions. For example, the power consumption undergoes a conspicuous increase when fuel cell activation is commenced under low temperature conditions.

In particular, during short-term running conditions in which the vehicle is operated for an extremely short time, vehicle operation may be terminated in the period when power generation by the fuel cell may or may not be enabled. Consequently even if the fuel cell is activated, it is often the case that power will be not supplied from the fuel cell. Consequently power is unnecessarily consumed by activating the fuel cell.

It is therefore an object of this invention to suppress power consumption by operating the vehicle without activating the fuel cell when large amounts of energy are required to activate the fuel cell.

Furthermore when the vehicle is operated for only a short period of time, unnecessary power consumption can be avoided by not activating the fuel cell.

In order to achieve the above object, this invention is provided with a fuel cell power plant for a mobile unit. The mobile unit has a drive device for running the mobile unit when supplied with power. The power plant comprises a fuel cell generating power when supplied with fuel, a battery charged with power generated by the fuel cell, a power regulating device selectively distributing the power from the battery and the fuel cell to the drive device and a controller for controlling vehicle operation. The controller estimates the energy required to activate the fuel cell and sets a determination value corresponding to a relatively small amount of energy within the energy required to drive the fuel cell. When the estimated energy required for activation is greater than or equal to the determination value, the fuel cell is not activated and the power regulating device is controlled in order to supply power from the battery to the drive device.

The details as well as other features and advantages of the invention are set forth in the remainder of the specification and are shown in the accompanying drawings.

BRIEF DESCRIPTION OF THE DRAWINGS

FIG. 7 shows the characteristics of the relationship of running mode reference parameters and the limiting value for a running mode.

DESCRIPTION OF THE PREFERRED EMBODIMENTS

In order to describe the invention in greater detail, the preferred embodiments will be outlined below with reference to the accompanying figures.

Figure 1:
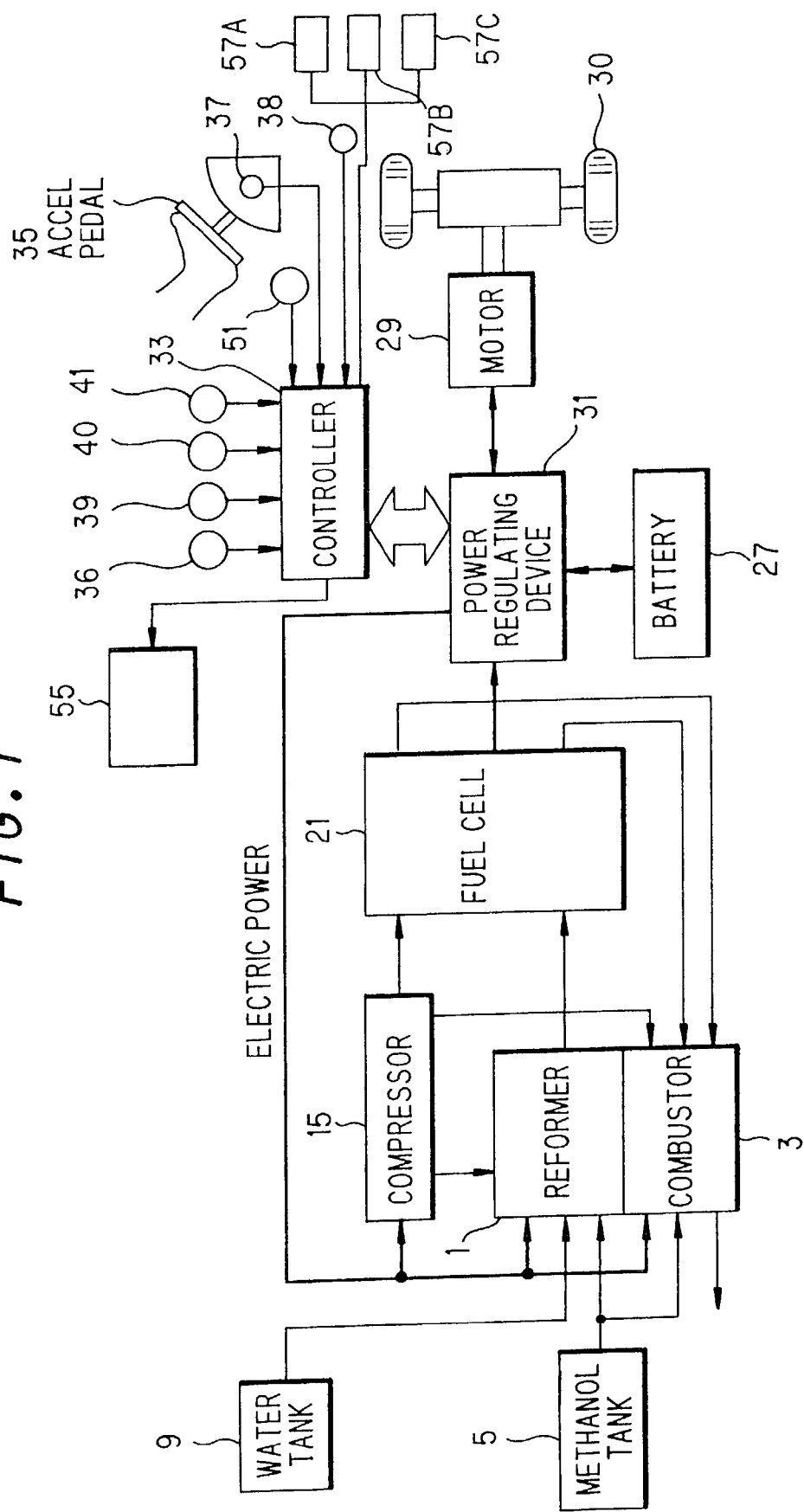
FIG. 1 is a block diagram of a first embodiment of this invention.

FIG. 1 is a block diagram of the structure of a fuel cell vehicle according to a first embodiment of the invention. This fuel cell vehicle is a hybrid fuel cell automobile mounting a power source comprising a storage battery and a fuel cell having a fuel reformer.

The fuel reformer 1 generates a reformate gas containing hydrogen from a fuel containing a hydrocarbon. For example when methanol is used as the fuel, methanol as the fuel stored in a methanol tank 5 is combined with water from a water tank 9 in order to generate a reformate gas containing hydrogen from steam reforming reactions.

The fuel reformer 1 may be supplied with air as required from a compressor 15 in order to generate a reformate gas by partial oxidation of methanol.

The reforming reaction performed in the fuel reformer 1 may be divided into steam reforming reactions which are endothermic and partial oxidation reactions which are exothermic.

The fuel cell 21 is provided with an anode and a cathode electrode. Reformate gas from the fuel reformer 1 is supplied to the anode electrode and air from the compressor 15 is supplied to the cathode electrode. The fuel cell 21 generates power from electrochemical reactions using oxygen in the air and hydrogen in the fuel gas.

A combustor 3 is provided downstream of the fuel cell 21. The combustor 3 is disposed adjacent to the fuel reformer 1. Since the oxygen in the air and the hydrogen in the reformate gas supplied to the fuel cell 21 are not completely consumed, the excess of the reformate gaseous discharge containing hydrogen and discharged air containing oxygen are combusted in the combustor 3. The combustor 3 transfers the resulting heat of combustion to the fuel reformer 1 where it is used in order to vaporize water and methanol. For this purpose, air from the compressor 15 is combusted as required together with methanol from the methanol tank 5 in the combustor 3.

A motor 29 driven by supplied electric power is provided in order to drive the fuel cell vehicle. The motor 29 is connected to drive wheels 30 and the vehicle is driven by the rotations of the motor 29.

A battery 27 is provided separately from the fuel cell 21. When the fuel cell vehicle decelerates, The battery 27 is charged with the excess amount of power generated by the fuel cell and power generated by operating the motor 29 as a generator when the fuel cell vehicle decelerates. Conversely when the output of the fuel cell 21 is insufficient to satisfy the power consumption of the compressor 15, the fuel reformer 1 and the combustor 3 or to meet the required power for running the motor 29, the battery 27 supplies the deficit of the fuel cell output.

A power regulating device 31 is provided in order to selectively distribute the power from the fuel cell 21 and the battery 27 to the motor 29 and the auxiliary devices (compressor 15, fuel reformer 1, combustor 3 and the like).

A controller 33 is provided to control the distribution of power by the power regulating device 31.

The controller 33 comprises a central processing unit (CPU), a RAM, a ROM and an input/output interface and may comprise a plurality of microcomputers. Signals are input into the controller 33 from a ignition switch 36 which indicates startup of vehicle operation, an accelerator pedal sensor 37 which outputs a signal in response to the depression amount (accelerator opening) of an accelerator pedal 35, a vehicle speed sensor 38 which outputs a signal in response to the vehicle speed, a SOC sensor which detects the level of charge (state of charge) in the battery 27, a temperature sensor 40 which detects the temperature about the fuel cell and temperature sensor 41 which detects the temperature of the atmosphere.

In this invention, particularly at startup of fuel cell vehicle operation, the controller 33 performs a control routine for fuel cell activation in order to avoid unnecessary power consumption.

At startup of vehicle operation, the fuel cell 21 must be activated and time is required until power generation by the fuel cell is enabled. The time required varies in response to the operating conditions and normally a relatively large amount of power is consumed until activation is completed.

In the period until power generation by the fuel cell 21 commences, the motor 29 is driven by power supplied from the battery 27. However particularly when the operating time is short, for example when vehicle operation is terminated before the fuel cell 21 actually initiates power generation, activating the fuel cell 21 merely results in adverse effects on fuel efficiency due to unnecessary consumption of electric power.

Consequently the controller 33 estimates the energy required to activate the fuel cell 21 based on the operating conditions at that time. The fuel cell 21 is activated only when the activation energy is small. In other cases, power consumption resulting from activation is suppressed since the activation control routine is not performed.

Figure 2:
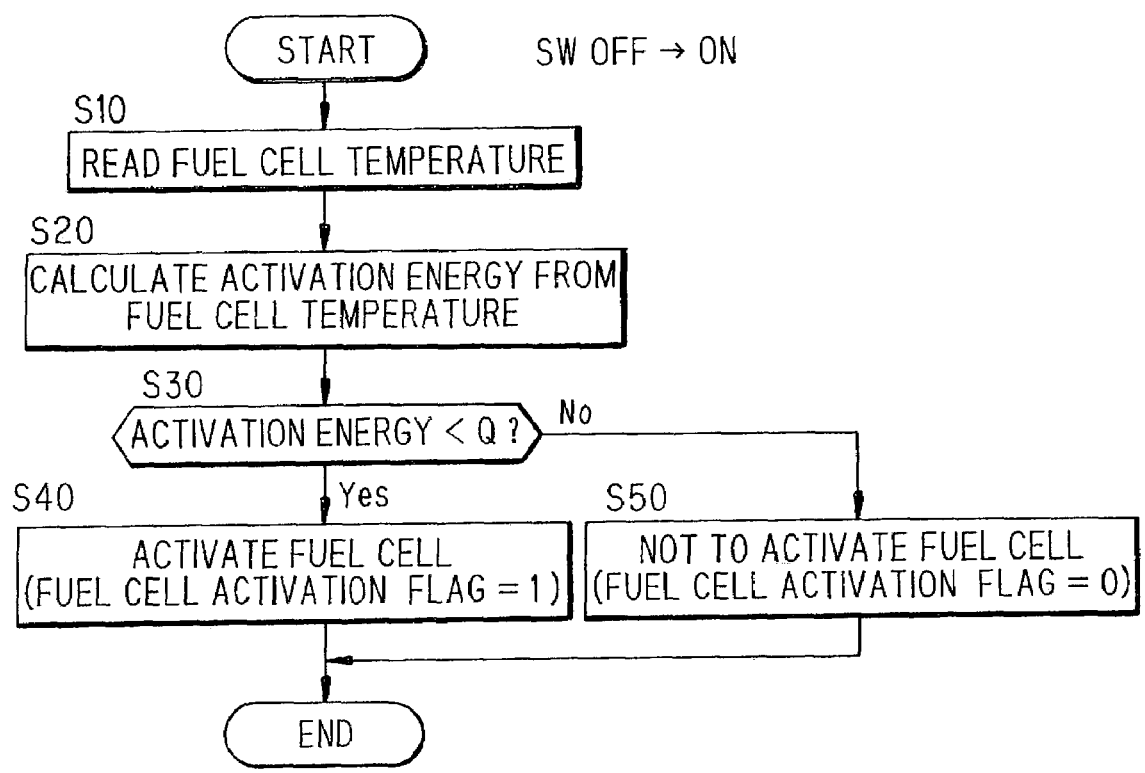
FIG. 2 is a flowchart describing an activation control routine for a fuel cell according to the first embodiment.

A control routine performed by the controller 33 will be described with reference to FIG. 2. FIG. 2 is performed only on one occasion when the ignition switch (IGN) is switched from the OFF to the ON position.

In the control routine as shown in FIG. 2, the activation energy required to activate the fuel cell is estimated based on the temperature of the fuel reformer 1.

In a step S10, the temperature of the fuel reformer 1 (which corresponds to the temperature of the fuel cell) detected by the temperature sensor 40 is read. In a step S20, the energy required to activate the fuel cell is calculated by looking up a table as shown in FIG. 3 based on the detected temperature.

Figure 3:
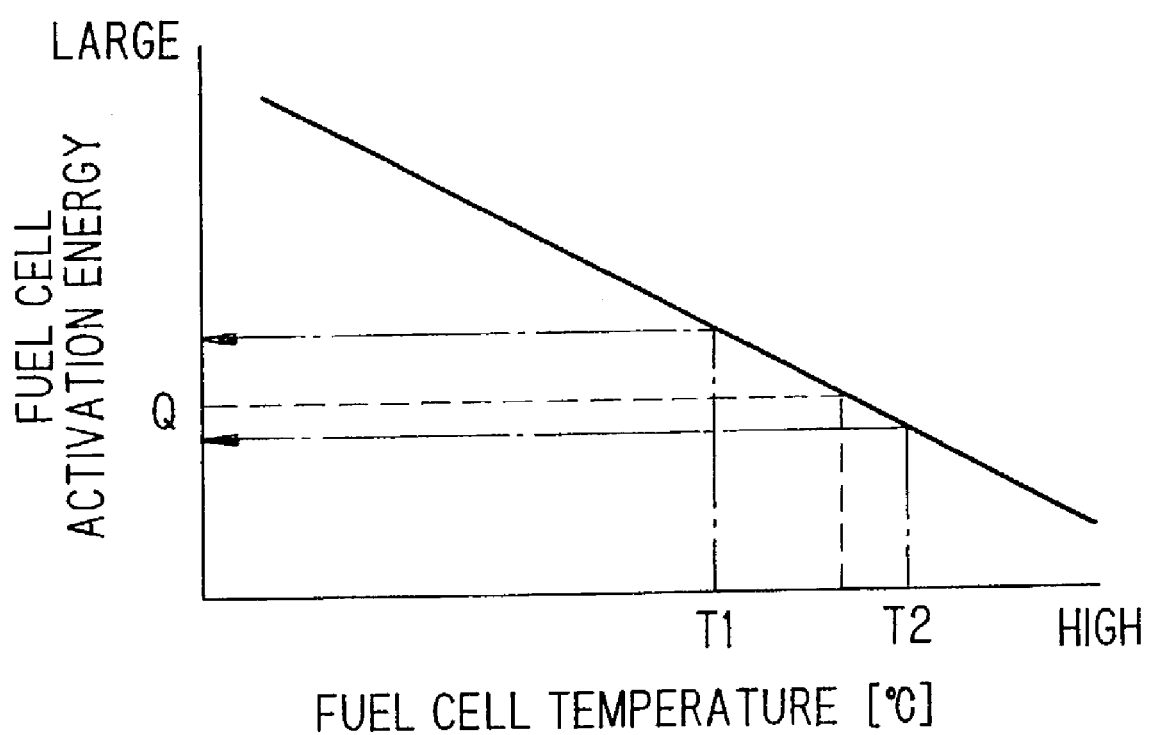
FIG. 3 shows the characteristics of the relationship between the temperature of the fuel reformer and the activation energy.

The energy required to activate the fuel cell as shown in FIG. 3 decreases as the fuel cell temperature increases. This is due to the fact that it is necessary for the temperature of respective components in the fuel cell to increase to a predetermined temperature during fuel cell activation. Consequently the required amount of heat for activation (activation energy) decreases as the temperature before activation increases.

In the step S30, a determination value Q is compared with the energy required to activate the fuel cell 21. The determination value Q is set to a value corresponding to the energy required for activation on restarting operation when the fuel cell 21 is sufficiently warmed up. This represents the situation when fuel efficiency does not greatly deteriorate and little energy is required for activation even if the fuel cell 21 is activated in a short-term operating mode. For example, the value is set to approximately 10% of the maximum value for activation energy assuming activation of the fuel cell in an extremely cold state. In this manner, an optimal value can be set based on empirical, experimental or statistical data.

When the energy required for activation of the fuel cell 21 is less than the determination value Q, the routine proceeds to a step S40 and the fuel cell 21 is activated. More precisely, an activation process for the fuel cell 21 is performed using an activation flag in which the fuel cell activation flag has a value of one (initial setting=0).

An example of the activation process for the fuel cell 21 will be described below.

When the activation routine is commenced, the fuel cell 21 is bypassed by connecting the inlet of the combustor 3 with the outlet of the fuel reformer 1. Thereafter exothermic reactions resulting from partial oxidation reactions are performed by supplying air and fuel to the fuel reformer 1. The reformate gas from the fuel reformer 1 is supplied to the combustor 3 and H2, CO, HC in the reformate gas are combusted in the combustor 3. Once the temperature of the fuel reformer 1 reaches a predetermined temperature, autothermic reactions are performed by supplying water to the fuel reformer 1 or steam reforming reactions are performed by stopping the supply of air. When the detected temperature in the fuel reformer 1 shows that the stream reforming reactions have stabilized, supply of a reformate gas (H2 rich gas) to the fuel cell 21 is commenced in order to commence power generation by the fuel cell 21. Thereupon activation of the fuel cell 21 is completed.

Conversely when the energy required to activate the fuel cell 21 is greater than or equal to the determination value Q, the routine proceeds from the step S30 to a step S50 and the fuel cell 21 is not activated (fuel cell activation flag=0).

When the fuel cell 21 is being activated or is not activated, the vehicle operates in an EV running mode and is only supplied with power from the battery 27.

As shown in FIG. 3, when the temperature of the fuel cell (fuel reformer) is a low temperature T1, the energy required for activation is greater than the activation temperature Q. Thus the fuel cell (fuel reformer 1) is not activated. In contrast, at a temperature T2, since the energy required for activation is smaller than the determination value Q, the fuel cell 21 is activated.

Thus in this embodiment, when the fuel cell vehicle starts operating, if the energy required for activating the fuel cell 21 is large, the fuel cell 21 is not operated. In particular, when the operation is completed in a short time, it is possible to avoid unnecessary power consumption by the battery since energy is not required for activating the fuel cell 21.

Another embodiment of the invention will be described with reference to the flowchart in FIG. 4 which shows the operation of the controller 33.

Figure 4:
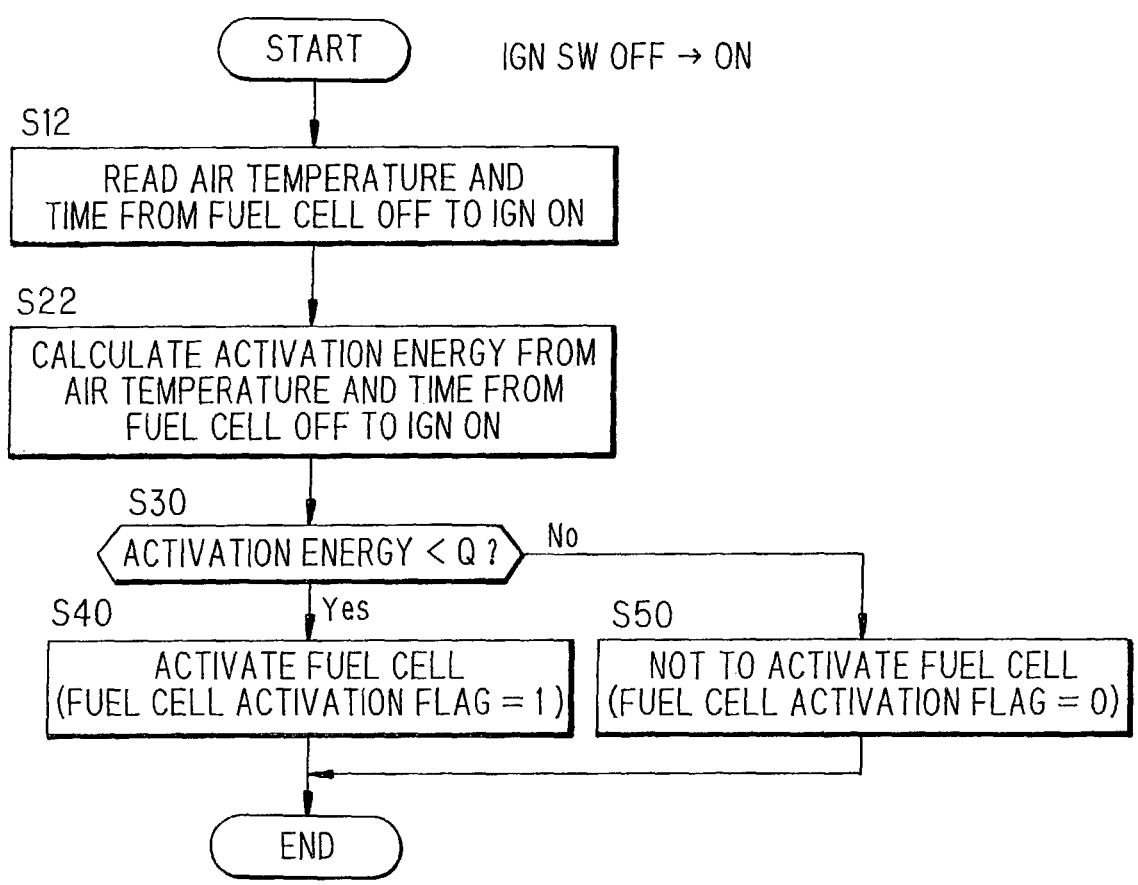
FIG. 4 is a flowchart showing an activation control routine for a fuel cell according to a second embodiment.

The point of difference from the first embodiment as shown in FIG. 2 is that, the steps S12, S22 of the second embodiment in FIG. 4 are different from the steps S10, S20 in FIG. 2.

That is to say, in the step S12, an elapsed time is read. This period is the time from stopping the fuel cell 21 on an immediately previous occasion by turning the ignition switch to the OFF position until the ignition switch is turned back to the ON position. The temperature detected by the temperature sensor 40 is read. The elapsed time is measured by a timer provided in the controller 33. Instead of the temperature sensor 40, a temperature sensor may be provided to read the external temperature and this detected external temperature may be read.

Figure 5:
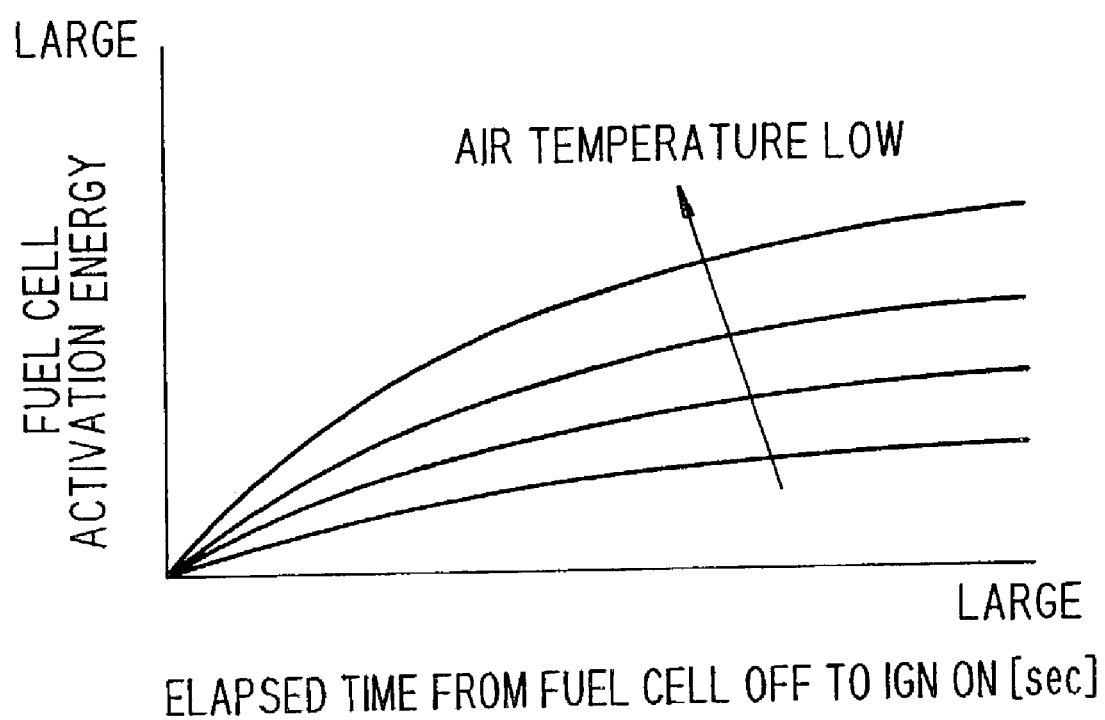
FIG. 5 shows the characteristics of the relationship between the external temperature and the activation energy of the reformer and the elapsed time after stopping the reformer until the ignition key switched to the ON position.

In a step S22, the energy required for activating the fuel cell 21 is calculated by looking up a map as shown in FIG. 5 based on the elapsed time and the external temperature.

When the elapsed time is held constant, the energy required for activation as shown in FIG. 5 decreases as the external temperature increases. When the external temperature is held constant, the energy increases as the elapsed time increases.

This is due to the fact that it is necessary for the temperature of respective components such as the fuel reformer 1 to increase to a reference temperature during activation of the fuel cell 21. Consequently the required amount of heat (activation energy) for activating the fuel cell 21 decreases as the external temperature increases. Furthermore after the operation of the fuel cell 21 is stopped on an immediately previous occasion, the energy required for activation increases as the time increases until a subsequent startup operation. This is due to the fact that the temperature of the fuel reformer falls in response to the elapsed time after stopping the fuel cell 21 and results in a corresponding increase in the amount of heat required for reactivation.

According to this embodiment, it is possible to perform an accurate estimation of the energy required for activation by estimating the energy required for activating the fuel cell 21 based on the elapsed time from stopping the fuel cell 21 on an immediately previous occasion until the ignition switch is placed in the ON position on a subsequent occasion or based on the external temperature at that time.

A third embodiment of this invention will be described with reference to the flowchart in FIG. 6 which shows the operation of the controller 33.

Figure 6:
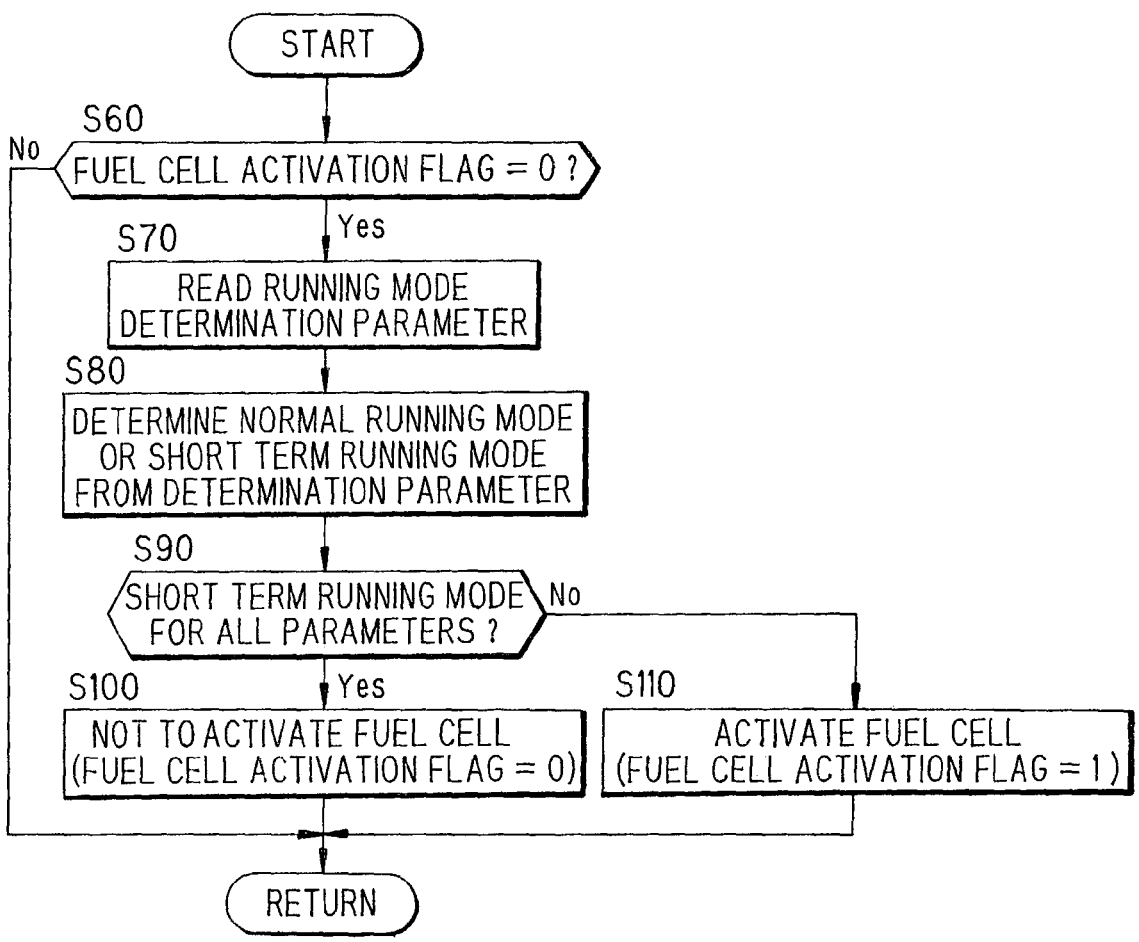
FIG. 6 is a flowchart showing an activation control routine for a fuel cell according to a third embodiment.

The flowchart shown in FIG. 6 supplements the first embodiment as shown in FIG. 2 or the second embodiment as shown in FIG. 4. That is to say, after the control routine shown in FIG. 2 has been performed, the flowchart in FIG. 6 is executed at a period of 10 milliseconds for example. However it is stopped after the fuel cell has once been activated.

In the step S60 as shown in FIG. 6, the value of the fuel cell activation flag is checked. This value is set as a result of the ignition switch being turned from OFF to ON in FIG. 2.

When the fuel cell activation flag has a value of zero, the routine proceeds to a step S70 and subsequent steps. In the steps S70, S80, S90, determination of the running mode is performed. That is to say, in the step S70, the running mode determination parameters are read. The running mode determination parameters are defined herein as:
① actual running time after switching ignition switch to ON position
② actual running speed
③ required amount of power for running
④ power consumption by battery
⑤ depression speed of accelerator pedal The actual running time [sec] in ① above may be measured by a timer provided in the controller 33. The actual running speed [m/s] in ② above is detected by a vehicle speed sensor (not shown). The required amount of power [kW] for running in ③ above is detected based on the opening of the accelerator detected by the accelerator pedal sensor 37. The power consumed by the battery (kW) in ④ above is calculated from the SOC (state of charge) [%] which is a value representing the battery capacity. The speed of depressing the accelerator pedal 35 [opening/s] in ⑤ above is calculated based on the accelerator opening detected by the accelerator pedal sensor 37.

In the step S80, the five running mode determination parameters above are used separately in order to determine whether the vehicle is operating in a normal running mode or whether it is operating in a short-term operating mode. The respective determinations are performed based on FIG. 7.

The left end in the uppermost panel in FIG. 7 (first step) is the minimum value for actual running time (for example 0 sec). The threshold value dividing short-term operation running mode from normal running mode is basically determined in the following sequence.

(1) A map is prepared on the basis of simulations or running tests in company premises in order to determine the threshold time for the short-term operation running mode or normal running mode with respect to respective vehicle running conditions (external temperature, humidity, load or the like).

(2) The threshold time (map value) is corrected based on the actual vehicle operating conditions.

In the second panel in FIG. 7, the left end represents a minimum actual running speed (for example 0 m/s). The right end is the maximum actual running speed. The threshold speed between the short-term operation running mode and normal running mode is determined based on the power consumption amount at that time and the general running pattern. The actual running speed is assumed to be an instantaneous value.

The left end of the third panel of FIG. 7 is the minimum required amount of power (for example 0 kW) for running. The right end is the maximum required amount of power for running. The maximum required amount of power for running is determined from the maximum load running pattern for the vehicle. In the same manner, the left end in the fourth panel in FIG. 7 represents the minimum power consumption amount by the battery (for example 0 kW) and the right end is the maximum power consumption amount by the battery.

The maximum power consumption amount by the battery is determined in response to the battery capacity.

The left end in the lowermost panel of FIG. 7 represents the minimum accelerator pedal depression speed (for example 0 opening/s) and the right end represents the maximum accelerator pedal depression speed.

The reason for why the accelerator pedal depression speed is used instead of the accelerator pedal depression amount and why a normal running mode is determined when the value thereof is greater than or equal to the threshold value is as follows. A large depression speed on the accelerator pedal 35 represents strong fluctuation in the load on the vehicle. Consequently when the load undergoes strong fluctuation, the load on the battery 27 increases due to the increase in the frequency of a charging/discharging operation by the battery 27. Thus when such load fluctuation occurs frequently, the fuel cell 32 is activated in order to reduce the load on the battery 27 resulting from charging and discharging operations (normal running mode).

In this manner, when the actual running time is short, when the actual running speed is low, when the required power for running or amount of power consumed by the battery is low or when the speed of depressing the accelerator pedal is low, a short-term operation running mode is determined. In contrast, when the actual running time is long, when the actual running speed is high, when the required power for running or amount of power consumed by the battery is large or when the speed of depressing the accelerator pedal is high, a normal running mode is determined. The respective threshold values in FIG. 7 differ depending on the size of the vehicle.

In the step S90 in FIG. 6, it is determined whether the vehicle is in either running mode. When there is one running mode determination parameter, if short-term operation running mode is determined, the routine proceeds to a step S100 and the fuel cell 21 is not activated (fuel cell activation flag=0). When short-term operation running mode is not determined, the routine proceeds from the step S90 to a step S110 and the fuel cell 21 is activated (fuel cell activation flag=1).

When the ignition switch is switched from the OFF position to the ON position, even when the fuel cell 21 has not been activated due to the fact that the energy required for activation is greater than the determination value Q (steps S30, S50 in FIG. 2), the reformer 1 may be activated (step S90, S110 in FIG. 6) when normal running mode is determined from the running mode determination parameter thereafter.

Actually since five running mode determination parameters are used, in the step S90, it is checked whether or not short-term operation running mode has been determination with respect to all the five running mode determination parameters. When it is determined with respect to all the five running mode determination parameters that the vehicle is running in short-term operation running mode, the routine proceeds to a step S100 and the fuel cell 21 is not activated.

In contrast, when even one of the five running mode determination parameters shows that the vehicle is not operating in short-term operation running mode, the routine proceeds from the step S90 to the step S110 and the fuel cell 21 is activated. This is due to the fact that when even one of the five running mode determination parameters determines normal running mode, there is the possibility that the fuel cell 21 will not be activated before the capacity of the battery 27 reaches a lower limiting value if the vehicle continues to operate in short-term operation running mode. In order to prevent this type of problem, the fuel cell 21 is activated when any one of the running mode determination parameters corresponds to normal running mode.

Consequently after placing the ignition switch in the ON position, it is determined at a fixed period whether the running mode is normal running mode or short-term operation running mode based on the running mode determination parameters. The activation or non-activation of the fuel cell 21 is controlled on the result of that determination. Consequently the activation or non-activation of the fuel cell 21 can be controlled in response to the running mode. This allows improvement to actual fuel efficiency and prevents reductions in performance.

However the method of determining the running mode is not limited to that described above. For example, learning control can be used to store a date/time running pattern comprising any one of a calendar 57A, a clock 57B, a GPS 57C (see in FIG. 1) or a combination thereof. Thus it is possible to determine either short-term operation running mode or normal running mode according to the stored date/time running pattern. The date/time running pattern is a running pattern specific to the driver determined on the date, day of the week or time period. For example, when the fuel cell vehicle is used for delivering goods, in a weekday time period, it is clearly the case that the vehicle will frequently operate in a short-term operation running mode due to performing deliveries to high-density housing areas. In this case, learning control stores short-term operation running mode as the mode for the delivery time period. Consequently in that time period, short-term operation running mode is immediately determined without performing a determination of the running mode and the vehicle continues operation without activating the fuel cell 21.

A fourth embodiment of this invention will be described with reference to FIG. 8.

Figure 8:
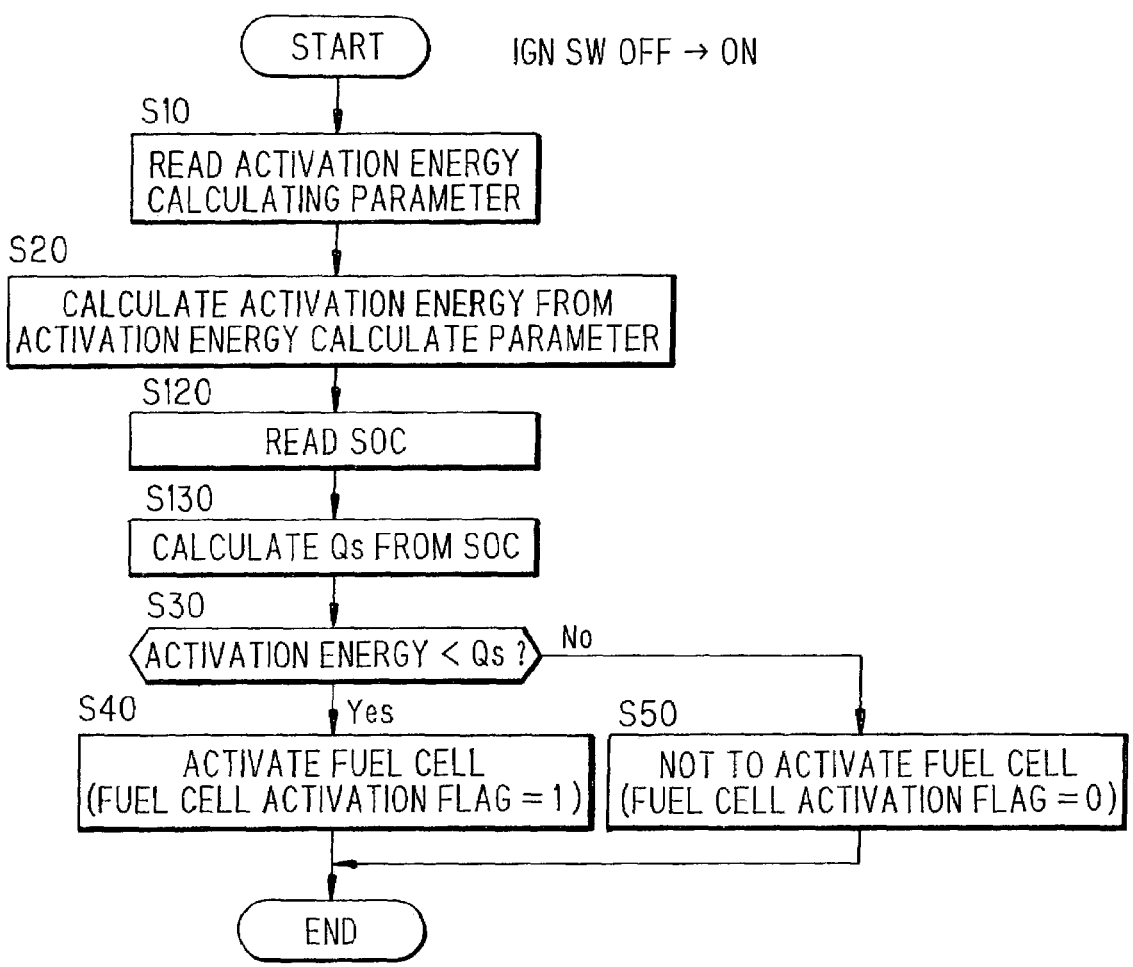
FIG. 8 is a flowchart showing an activation control routine for a fuel cell according to a fourth embodiment.

The flowchart in FIG. 8 is substituted for the flowchart in FIG. 2 and FIG. 4 of the first and second embodiments.

The point of difference from the first and second embodiments resides in the step S120 and the step S130 in FIG. 8. That is to say, a value for SOC showing the state of charge of the battery 27 is read from the output of a SOC sensor 39 at a step S120. Thereupon the routine proceeds to a step S130 and the determination value Qs for the energy required to activate the fuel cell 21 is calculated by looking up a table as shown in FIG. 9 based on the value for the SOC.

Figure 9:
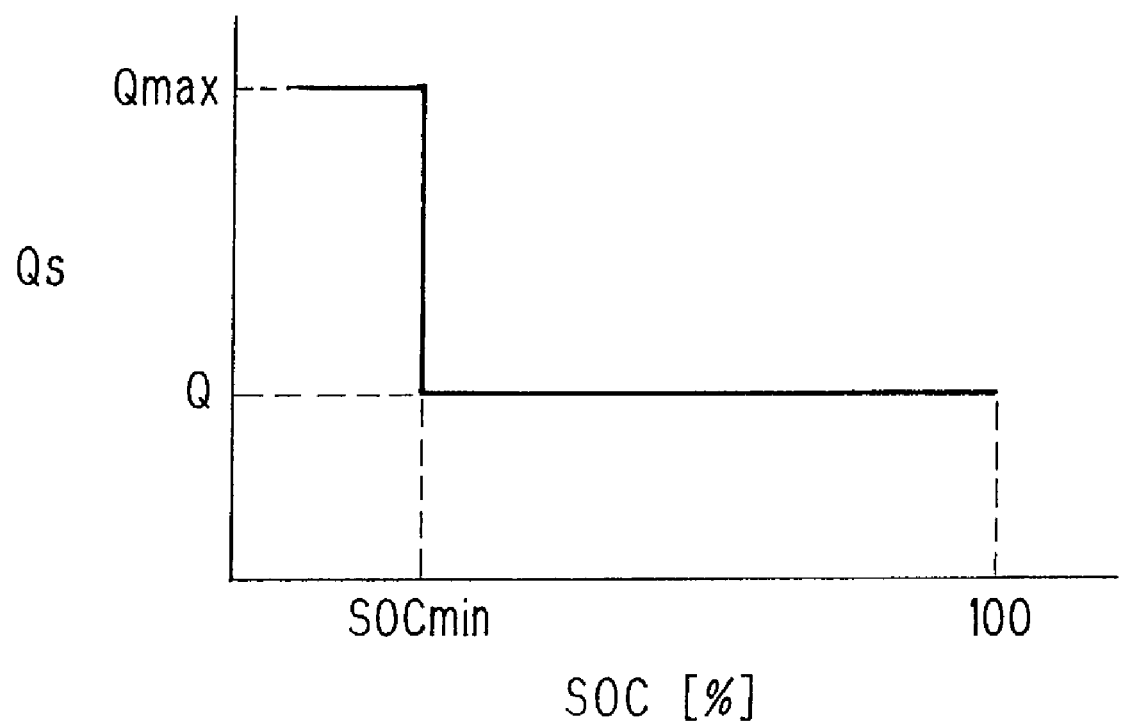
FIG. 9 shows the characteristics of the relationship between state of charge (SOC) and the determination value.

When the determination value Qs as shown in FIG. 9 is larger than the lower limiting value SOCmin, it takes the same value as the determination value Q in the third embodiment. When SOC is less than or equal to the lower limiting value SOCmin, the determination value Qs is a value which corresponds to the maximum value Qmax for the assumed energy required for fuel cell activation.

Consequently when the value of SOC in FIG. 8 is less than the lower limiting value SOCmin, the determination value Qs for the energy required for activation takes a maximum value Qmax for the assumed energy for activation. At this time, in a step S30, since the energy required to activate the fuel cell 21 is always less than the determination value Qs, the routine proceeds from the step S30 to the step S40 and the activation of the fuel cell 21 is ensured.

Even when operating for a short time, if the SOC falls to a level at which the battery fails (that is to say, SOC reaches SOCmin), the vehicle can not operate while the fuel cell 21 is being activated. In order to prevent this type of problem, a residual battery charge is designated which is sufficient to drive the vehicle only using the motor 29 while the fuel cell 21 is being activated.

The steps S10 and S20 in FIG. 8 represent the steps S10, S20 in FIG. 2 or the steps S12, S22 in FIG. 4. That is to say, in the step S10 in FIG. 8, the calculation parameters for the energy required for fuel cell activation are read (the temperature of the fuel cell in the first embodiment, the external temperature and the elapsed time from stopping the fuel cell to switching the ignition switch to the ON position in the second embodiment). In the step S20 in FIG. 8, the energy required for activation is calculated based on the parameters (using the control routine in the first embodiment, a table as shown in FIG. 3 is looked up, using the control routine in the second embodiment, a map as shown in FIG. 5 is looked up).

Thus in the present embodiment, since the determination value for the energy required for activation is varied in response to the SOC of the battery 27, it is possible to prevent the vehicle not being able to be driven by the motor 27 as a result of the residual battery charge being consumed during activation of the fuel cell 21.

Figure 10:
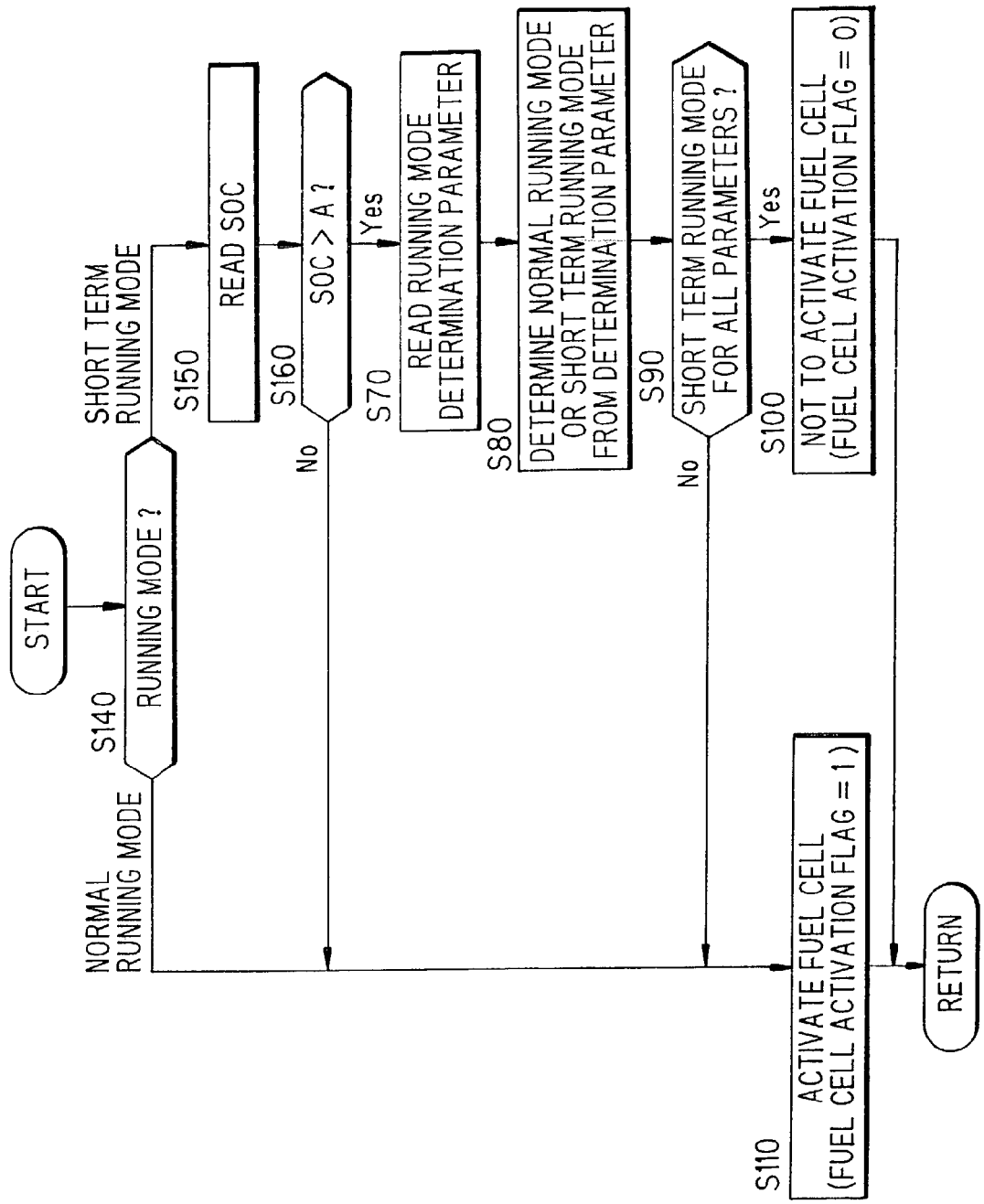
FIG. 10 is a flowchart showing an activation control routine for a fuel cell according to a fifth embodiment.

FIG. 10 shows a fifth embodiment of this invention.

The flowchart in FIG. 10 corresponds to the flowchart in FIG. 6. The control routine shown in FIG. 10 is commenced when the ignition switch is switched from an OFF position to an ON position. The routine is repeated at a period of 10 milliseconds and terminated after activation of the fuel cell 21 is completed.

The point of difference from the third embodiment is that the steps S140, S150 and S160 are introduced in place of the step S60 in FIG. 6.

That is to say, a running mode selection switch 51(see in FIG. 1)is provided in the driver's compartment in the fifth embodiment in order to allow selection of normal running mode or short-term operation running mode.

In the step S140, it is determined whether the driver has selected either normal running mode or short-term operation running mode on the basis of the switch signal. If the driver selects normal running mode, the routine proceeds to a step S110 and the fuel cell 21 is activated (fuel cell activation flag=1).

On the other hand, when short-term operation running mode is selected, the routine proceeds to a step S150, and the SOC of the battery 27 is read. In the step S160, this value for the SOC is compared with a determination value A.

For example, when the short-term operation running mode is selected by the driver, the determination value A corresponds to a SOC (fixed value) at which there is the possibility of the vehicle not operating due to battery failure if the vehicle is operated only with power from the battery.

Although the determination value A must be derived empirically, experimentally or statistically, 10–15 mode running which is an operation test mode may be substituted and used in the calculation of the determination value A.

When SOC is less than or equal to the determination value A, it is determined that the vehicle will not operate due to battery failure when running on battery power. In this case, the routine proceeds to a step S110 and the fuel cell 21 is activated. However in order to avoid stopping the vehicle while running, it is preferred that running is commenced after activation of the fuel cell 21 has progressed to a level allowing vehicle running to be maintained or that when running is commenced after power generation by the fuel cell 21 commences.

When SOC is greater than the determination value A, the residual battery charge is determined to be a value which at least allows short-term operation running after the fuel cell 21 is activated from a cold state until power generation commences. Thereupon the routine proceeds from the step S160 to the step S70 and the same process as shown in FIG. 3 with reference to the third embodiment is performed.

In this embodiment, when the driver selects normal running mode with the running mode selection switch, the running time using only battery power is shortened by immediately activating the fuel cell 21 and thus it is possible to reduce the energy consumption from the battery 27.

When the driver selects short-term operation running mode, the current SOC state is determined. When running is performed only using battery power, operation in short-term operation running mode is only allowed when vehicle operation will not result in battery failure. Consequently it is possible to avoid a reduction in the residual battery charge.

A sixth embodiment will be described with reference to FIG. 11.

Figure 11:
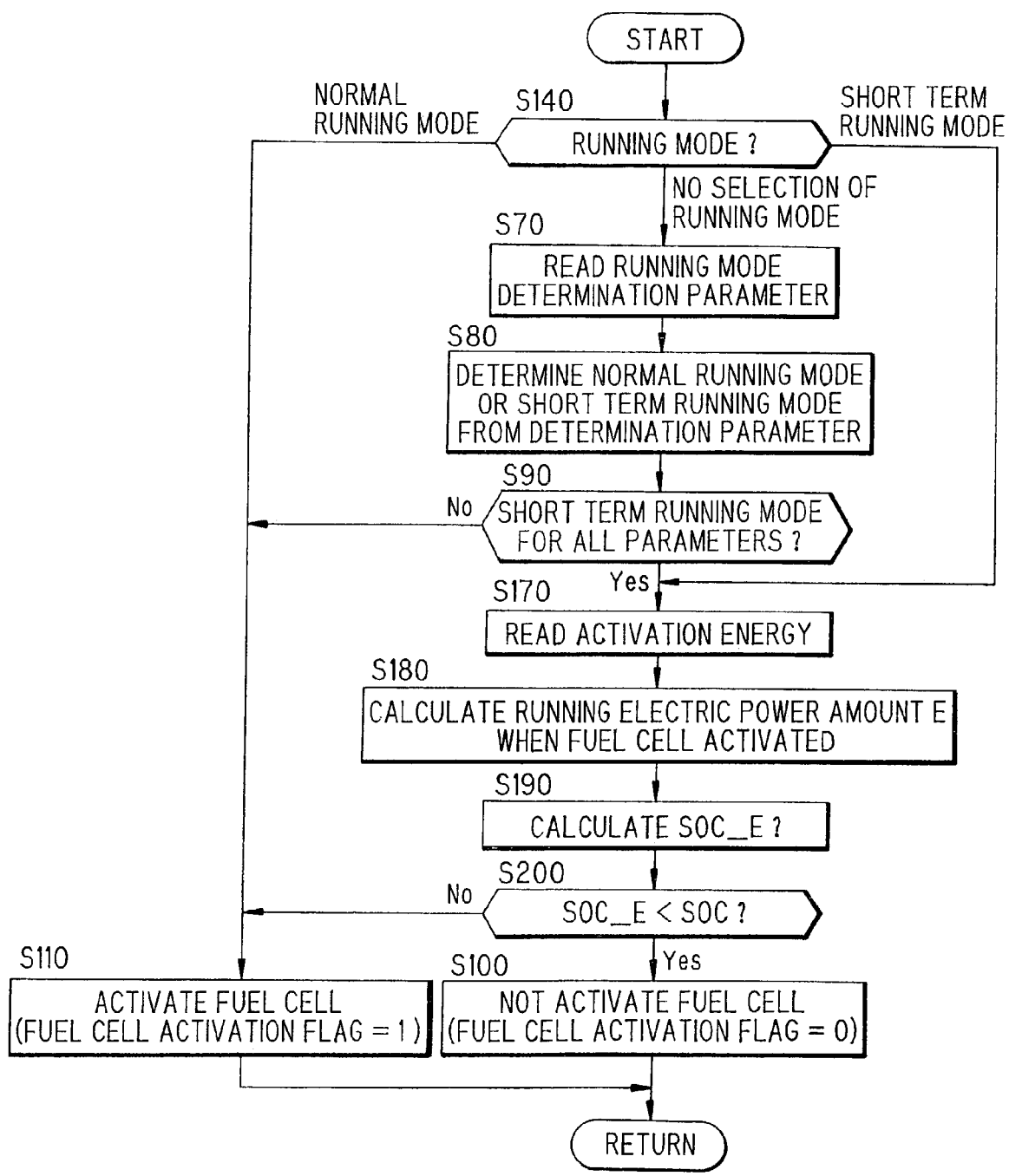
FIG. 11 is a flowchart showing an activation control routine for a fuel cell according to a sixth embodiment.

The flowchart shown in FIG. 11 is substituted for the flowchart in FIG. 10 in the fifth embodiment.

The point of difference from the fifth embodiment resides in the method of handling the running mode selection switch signal and in the fact that new steps S170, S180, S190 and S200 are added.

That is to say, in the step S140, the signal from the running mode selection switch 51 is checked to determine whether the driver has selected a running mode or whether either running mode has not been selected.

The control routine when the driver has selected the normal running mode is the same as that described with respect to the fifth embodiment. The routine proceeds to a step S110 and the fuel cell 21 is activated.

When the driver selects the short-term operation running mode, the routine proceeds to the steps S170, S180 from the step S140, and the energy required for activation stored in the step S20 in FIG. 2 is read. This value is used in order to calculate a running power amount E[Wh] during activation of the fuel cell 21.

The calculation of the running power amount E during fuel cell activation is as follows.

Figure 12:
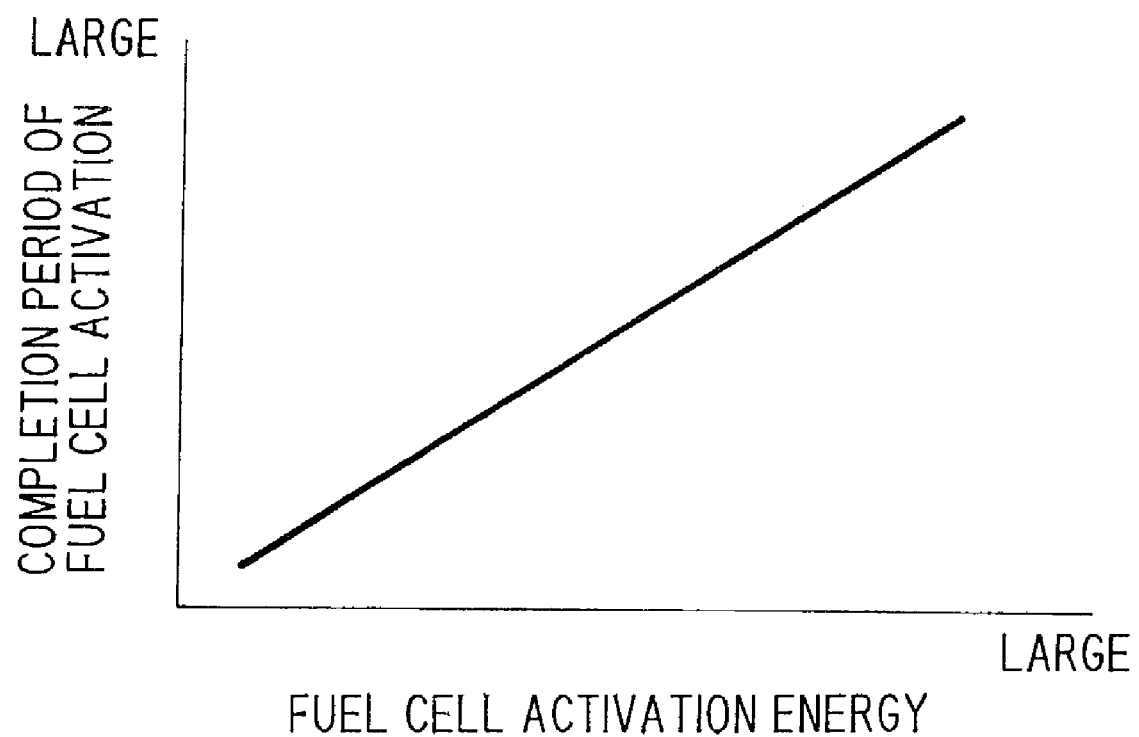
FIG. 12 shows the characteristics of the relationship between the activation energy of the fuel cell and the activation completion time.

Firstly, the period until completion of the activation of the fuel cell 21 is calculated by looking up a table as shown in FIG. 12 based on the energy required for activation of the fuel cell 21. Then the operation in this period is taken to be a 10–15 mode running. Thus the amount of power consumed when running on the motor 29 in 10–15 mode during the period until activation of the fuel cell 21 is completed can be measured or calculated on the basis of experiment. In this manner, when relationship of the fuel cell activation completion time to energy consumption during that time is set in a predetermined table, it is possible to calculate the running power amount E during fuel cell activation by looking up the table based on the reformer activation completion time.

The relationship between the power consumption by auxiliary devices in order to activate the fuel cell 21 and the fuel cell activation completion time can be calculated experimentally and set in a table. Thus the running power amount E during fuel cell activation can be calculated more accurately by adding this value to the power consumed when running only on the motor 29.

In a step S190, a consumption ratio of the battery 27 when the battery 27 uses a running power amount E during fuel cell activation is calculated as SOC-E[%]. The consumption ratio SOC-E is compared with a current value for SOC in a step S200. When the consumption ratio SOC-E is greater than or equal to the current value SOC, since vehicle operation without immediately starting the fuel cell 21 will result in battery failure, the routine proceeds to a step S110 from the step S200 and the fuel cell 21 is immediately activated (fuel cell activation flag=1).

In this case, it is possible to ensure prevention of battery failure during vehicle operation if running is not commenced until the value for SOC is greater than the consumption ratio SOC-E.

In contrast, in a step S200, when the consumption ratio SOC-E is less than the value for SOC at that time, it is determined that it is possible to continue short-term operation running using only the battery power. Thereupon the routine proceeds to the step S100 and the fuel cell 21 is not activated (fuel cell activation flag=0).

On the other hand, in the step S140, when the driver has not selected either running mode from the two running modes, the routine proceeds to the step S70 and subsequent steps. In the same manner as the fifth embodiment, the content of the running mode parameters is determined and it is determined whether or not to activate the fuel cell 21.

When short-term operation running mode is determined in a step S90, the routine proceeds to the step S170 and subsequent steps. As a result, even when the driver has not selected either running mode, when short-term operation running mode is determined as a result of the running mode determination (steps S70, S80 and S90), if the value for the battery consumption ratio SOC-E is smaller than the current value for SOC, the routine proceeds to the step S110 from the step S200 and the reformer 1 is activated. In this manner, it is possible to ensure prevention of battery failure during short-term operation running.

In this embodiment, the running mode during fuel cell activation and the running mode after completion of fuel cell activation are determined in addition to the short-term operation running mode. As a result, the driver can be made aware of the selected running mode by a panel display or voice display 55 (see in FIG. 1) advising the driver of the three respective running modes.

This embodiment has described the activation of the fuel cell including whether or not the fuel reformer is activated as an example of a fuel cell provided with a fuel reformer. However the invention is not limited in this respect. The invention can be applied in the same manner with respect to whether or not to activate a fuel cell in a solid oxide fuel cell generating power by internal reforming reactions or a solid oxide fuel cell generating power directly from fuel using electrode reactions.

Although methanol has been described as the fuel supplied to the fuel reformer, the invention is not limited in this respect and propane gas, natural gas, naphtha gas or other hydrocarbon fuels may be used.

In the above embodiments, the fuel cell power plant for a mobile unit has been described with respect to application to a vehicle. However it is also possible to apply the invention to a ship or industrial machinery.

INDUSTRIAL APPLICABLE

The present invention can be applied to the running control for a fuel cell vehicle.

What is claimed is:

1. A fuel cell power plant for a mobile unit, the mobile unit provided with a drive device driving the mobile unit when supplied with electrical power, the power plant comprising:
a fuel cell generating power when supplied with fuel;
a battery charged with power generated by the fuel cell;
a power regulation device selectively distributing power from the fuel cell and the battery to the drive device;
a controller functioning to
estimate the energy required to activate the fuel cell;
set a determination value corresponding to a relatively small amount of energy in comparison to the energy required to activate the fuel cell; and
control the fuel cell and the power regulation device so that the fuel cell is not activated and power from the battery is supplied to the drive device when the estimated energy required to activate the fuel cell is greater than or equal to the determination value.

2. The power plant as defined in claim 1, wherein the controller activates the fuel cell when the estimated energy required to activate the fuel cell is less than the determination value.

3. The power plant as defined in claim 1 or claim 2, wherein the determination value is set to a value corresponding to approximately 10% of the maximum value of the energy required to complete activation of the fuel cell under cold conditions.

4. The power plant as defined in claim 1, further comprising a sensor for detecting the temperature of the fuel cell; and wherein the controller estimates the energy required to activate the fuel cell based on the temperature of the fuel cell.

5. The power plant as defined in claim 1, further comprising a timer for measuring time; and wherein the controller estimates the energy required for activation of the fuel cell based on the time from stopping the fuel cell on an immediately previous occasion to activating the fuel cell on the present occasion.

6. The power plant as defined in claim 1, further comprising a sensor for detecting an external temperature; and wherein the controller estimates the energy required for activating the fuel cell based on the external temperature.

7. The power plant as defined in claim 1, further comprising a SOC sensor for detecting the SOC of the battery; and wherein the controller
sets a lower limiting value permitted for the SOC of the battery; and
activates the fuel cell without reference to the energy required for the activation of the fuel cell when the detected SOC is less than or equal to the lower limiting value.

8. A fuel cell power plant for a mobile unit, the mobile unit provided with a drive device driving the mobile unit when supplied with electrical power, the power plant comprising:
a fuel cell generating power when supplied with fuel;
a battery charged with power generated by the fuel cell;
a power regulation device selectively distributing power from the fuel cell and the battery to the drive device;
a controller functioning to
determine a short-term operation running mode or a normal running mode;
activate the fuel cell when a normal running mode is determined from the determination result; and
control the fuel cell and the power regulation device so that the fuel cell is not activated and power from the battery is supplied to the drive device when the short-term operation running mode is determined.

9. The power plant as defined in claim 8, further comprising at least one of
a timer for measuring the time after starting the power plant;
a sensor for detecting the vehicle running speed;
a sensor for detecting the depression amount of the accelerator pedal;
a sensor for detecting the depression speed of the accelerator pedal;
a sensor for detecting the SOC of the battery; and wherein the controller determines the short-term operation running mode or the normal running mode based on at least one of the detection values.

10. The power plant as defined in claim 9, wherein the controller determines the normal running mode when any one of the following conditions are satisfied: when the measured time is long, when the vehicle speed is high, when the accelerator pedal depression amount is large, when the speed of depressing the accelerator pedal is high or when the power consumption by the battery is large.

11. The power plant as defined in claim 8, further comprising
a calendar measuring the date;
a clock measuring the time;
a GPS measuring position; and wherein
the controller uses a learning control routine to store a date/time pattern of the vehicle by combining the output values from one or more of the above components; and
determines the normal running mode or the short-term operation running mode based on any one current output value in the stored date/time running pattern.

12. A fuel cell power plant for a mobile unit, the mobile unit provided with a drive device driving the mobile unit when supplied with electrical power, the power plant comprising:
a fuel cell generating power when supplied with fuel;
a battery charged with power generated by the fuel cell;
a power regulation device selectively distributing power from the fuel cell and the battery to the drive device;
a switch allowing selection of a normal running mode or a short-term operation running mode; and
a controller functioning to
control the fuel cell and the power regulation device so that the fuel cell is not activated and power from the battery is supplied to the drive device when the short-term operation running mode is selected.

13. The power plant as defined in claim 12, wherein the controller both activates the fuel cell and controls the power regulation device so that power from the battery is supplied to the drive device when the normal running mode is selected.

14. The power plant as defined in claim 12, further comprising a sensor for detecting the SOC of the battery; and wherein the controller determines whether or not to activate the fuel cell based on the detected residual charge in the battery when the short-term operation running mode is selected.

15. The power plant as defined in claim 14, wherein the controller activates the fuel cell even when the short-term operation running mode is selected if the detected residual battery charge is low.

16. A fuel cell power plant for a mobile unit, the mobile unit provided with a drive device driving the mobile unit when supplied with electrical power, the power plant comprising:
a fuel cell generating power when supplied with fuel;
a battery charged with power generated by the fuel cell;
a sensor for detecting the SOC of the battery;
a power regulation device selectively distributing power from the fuel cell and the battery to the drive device;
a switch allowing selection of a normal running mode or a short-term operation running mode; and
a controller functioning to
estimate the energy required to activate the fuel cell;
estimate the time until completion of activation based on the energy required to activate the fuel cell;
estimate the power consumption during vehicle operation until the estimated time for fuel cell activation elapses;
control the fuel cell and the power regulation device so that the fuel cell is not activated and power from the battery is supplied to the drive device when the short-term operation running mode is selected if the residual battery charge is greater than the estimated power consumption; and
activate the fuel cell even when the short-term operation running mode is selected if the residual battery charge is less than the estimated power consumption.

17. The power plant as defined in claim 16, further comprising a device performing voice display or visual display; and
wherein the controller at least notifies the driver by a voice display or visual display that the fuel cell is being activated or that activation has been completed, when the short-term operation running mode is selected.

* * * * *